June 11, 1968  B. A. LOOMANS  3,387,826
MIXER APPARATUS

Filed Oct. 23, 1965  3 Sheets-Sheet 1

INVENTOR.
BERNARD A. LOOMANS
BY
Learman, Learman & McCulloch

June 11, 1968  B. A. LOOMANS  3,387,826
MIXER APPARATUS

Filed Oct. 23, 1965  3 Sheets-Sheet 2

INVENTOR.
BERNARD A. LOOMANS
BY
Learman, Learman & McCulloch

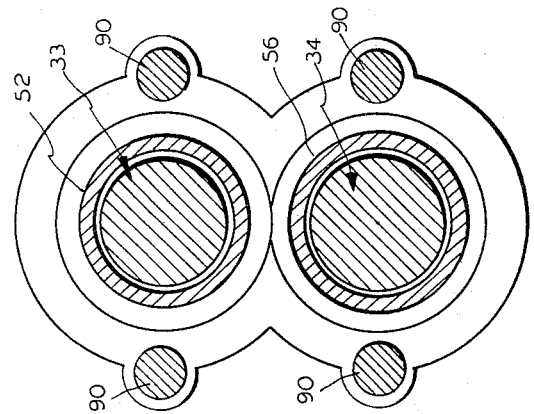
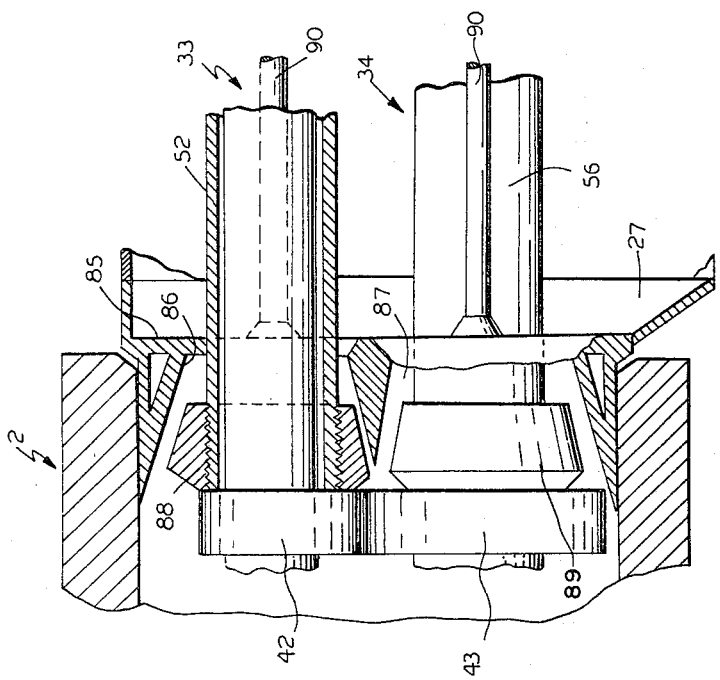

3,387,826
MIXER APPARATUS
Bernard A. Loomans, Saginaw, Mich., assignor to Baker Perkins Inc., Saginaw, Mich., a corporation of New York
Filed Oct. 23, 1965, Ser. No. 503,872
23 Claims. (Cl. 259—6)

ABSTRACT OF THE DISCLOSURE

Mixer apparatus of the type employing a plurality of spaced apart substantially parallel mixer or reactor shafts mounted for rotation in a chamber about their own axes and driven by a drive crank arm coupled to nesting crank arms connected with the mixer shafts. Disk members mounted on the mixer shafts between radially interacting mixer paddles which also conform to and wipe the walls of a chamber formed of intersecting cylindrical chamber walls cause the material to take a sinuous longitudinal path through the chamber. At the discharge end of the mixer apparatus discharge plate means is provided which has at least one opening through which at least one of the shafts generally concentrically extends and in which a nonintegral ring plug is mounted for rotation with the shaft, with the ring plug being of smaller diameter than the opening to form a passage to pass material out the opening.

---

This invention relates to apparatus for mixing and kneading a variety of materials in plastic, liquid, granular or powdered form, and more particularly to a continuously operable mixing or kneading apparatus having the ability to accommodate and process a wide variety of materials and process them in the most efficient manner according to their mixing, blending or kneading characteristics.

It is well known that the mixing or kneading of different kinds of materials requires the application of different forces to the materials under treatment, and some materials require the application of rather high forces. In a mixing machine where mixing paddles or blades are supported on elongate shafts that are journaled in the mixing chamber, the application of sufficiently high forces to the material is complicated by several factors. For example, shaft deflection is a major source of difficulty and the shafts must be kept sufficiently heavy so that deflection does not occur. In addition, in those instances where plural shafts are utilized in the mixing of materials, the close spacing required for the shafts makes it extremely difficult to apply adequate driving forces on the shafts, inasmuch as the size of the gear teeth that can be used to drive the shafts is limited by the diameter of the shafts and the distance between the centers of the driving and driven shafts.

An object of this invention is to provide a mixer having multiple blades or paddles that are so formed as to possess small dispersion angles so as to be capable of applying high forces to material being mixed or kneaded.

Another object of the invention is to provide mixing paddles or blades of the character referred to which are self cleaning and which effect cleaning of the mixer chamber.

A further object of the invention is to provide a mixer paddle and shaft construction of such size as to impart the desired mixing forces to the materials under treatment and without deflection of the shafts, and at the same time avoid the imposition of excessive forces on the shaft driving mechanism.

Another object of the invention is to provide a driving mechanism for two or more mixing shafts and in which the force available to impart rotation to the shafts has no theoretical limit.

Another object of the invention is to provide an eccentric, gearless drive mechanism for two or more mixer or like shafts and in which there is no dead center position.

A further object of the invention is to provide a mixer blade or paddle assembly arranged to impart a tortuous, sinusoidal path to the materials being mixed.

Another object of the invention is to provide a continuous mixing and feeding machine and in which the retention time of materials in the machine may be regulated.

Other objects and advantages of the invention will be pointed out specifically or will become apparent from the following description when it is considered in conjunction with the appended claims and the accompanying drawings, in which:

Figure 3:
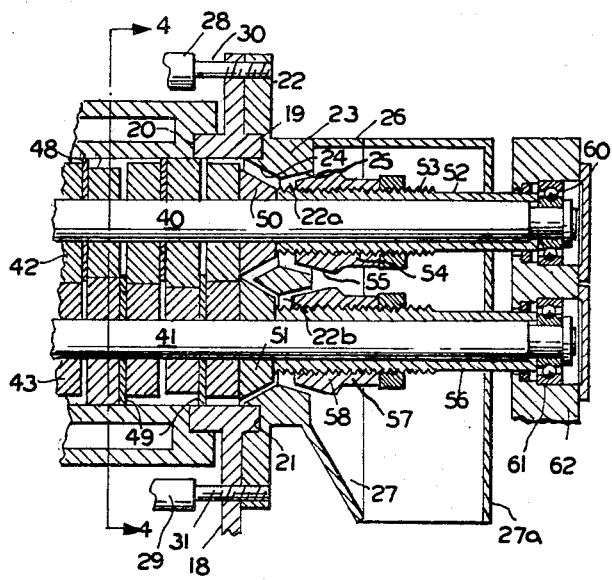
FIGURE 3 is an enlarged sectional view taken on the line 3—3 of FIGURE 1.
Figure 5:
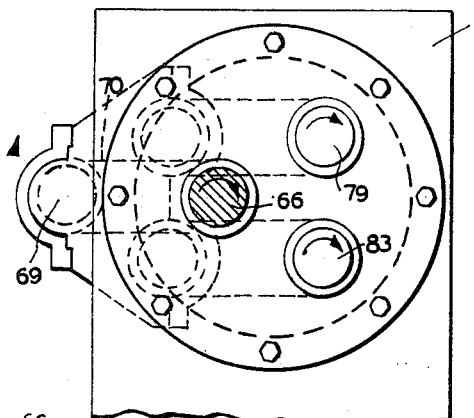
FIGURE 5 is a sectional view taken on line 5—5 of FIGURE 1, but illustrating the parts rotated 90° clockwise from the positions shown in FIGURE 1.
Figures 7, 8, 9:
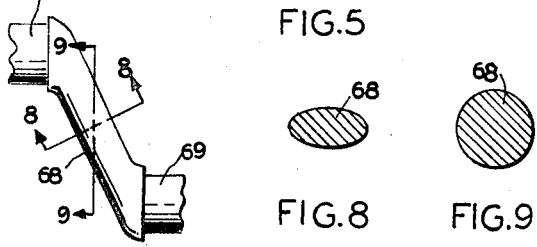
FIGURE 7 is a fragmentary, enlarged elevational view of a crank arm constructed in accordance with the invention.

FIGURES 8 and 9 are cross-sectional views taken on the lines 8—8 and 9—9, respectively, of FIGURE 7;

FIGURE 10 is a view similar to FIGURE 3, but illustrating a modification; and

FIGURE 11 is an end view of the apparatus shown in FIGURE 10.

Apparatus constructed in accordance with the embodiment of the invention disclosed in FIGURES 1–9 comprises a base 1 on which is mounted a mixer housing 2 of the kind disclosed in United States Letters Patent No. 3,195,868 and to which reference may be had for a more detailed disclosure. Briefly, however, the housing 2 is composed of two halves 3 and 4 pivoted to one another and to the base 1 at opposite ends of the housing by means of pivot pins 5 and 6, the two halves of the housing or barrel being releasably maintained in assembled relation by means of suitable bolts 7 or the like. Each barrel half has an outer wall 8 and an inner wall 9, the walls 8 and 9 being spaced from one another to provide space for the circulation of cooling or heating media, depending on the type of mixing operation to be performed. The inner walls 9, when assembled, form a hollow chamber 11 having the configuration of two intersecting cylinders. To one end of the barrel halves 3 and 4 is bolted a pair of half-cone members 12 and 13 which, in turn, are bolted to a pair of intersecting cylindrical members 14 and 15. The members 14 and 15 are provided with openings in their upper surfaces which, together, form an inlet opening 16 for the reception of materials to be mixed or kneaded. The members 12 and 13 together form a feeding zone 17 through which materials may be introduced to the housing 2.

At the opposite end of the housing 2 is a mounting plate 18 forming part of the means for mounting the housing on the base 1, the plate 18 having an opening therein surrounded by a flange 19. The forward portion of the flange 19 is accommodated in a recess 20 forming the rear end of each barrel half 3 and 4, and the rear end of the flange 19 is accommodated in a recess 21 formed in an end plate 22 having a radially inwardly projecting flange 23 consisitituting what may be termed weir plate means. The forward end of the flange 23 has a radially inwardly converging surface 24 which merges at its rear end with a radially converging surface 25. Secured to the rear end of the flange 23 is a cowl 26 having a discharge spout 27 at its lower side for the discharge housing 27a (FIGURE 3). The flange 23 of weir plate means 22 has a pair of openings 22a and 22b therein through which material may be discharged to the spout.

Means is provided for effecting some axial movement of the end wall 22 relative to the housing 2 while the machine is in operation and comprises a pair of hydraulic or pneumatic jacks 28 and 29 having reciprocable piston rods 30 and 31, respectively, which extend slideably through openings formed in the mounting plate 18 and are secured to the wall 22. The construction and arrangement are such that the end wall 22 may be moved from the position shown in FIGURE 3 toward the right, for a purpose presently to be explained, and the cooperation between the flanges 19 and the groove 21 is such as to permit such movement of the member 22 without providing a gap between the flange 19 and the forward edge of the conical surface 24.

Figure 4:
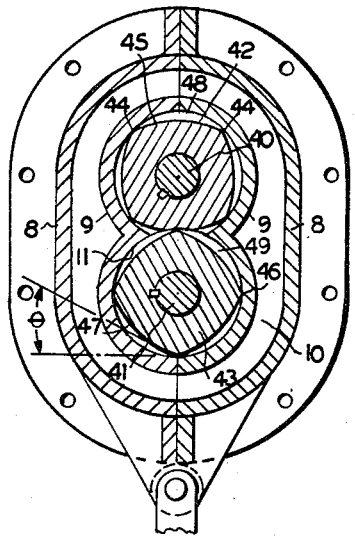
FIGURE 4 is a transverse sectional view taken on the line 4—4 of FIGURE 3.

Rotatably journaled in the housing 2 is a pair of spaced apart, substantially parallel mixer shafts 33 and 34. The shaft 33 includes a rear shank portion 35 that is journaled in an upstanding mounting plate 36 forming part of the housing mounting means. The shaft 34 includes a similar shank portion 37 that is similarly journaled. Within the feeding zone 17 the shafts 33 and 34 are provided with intermeshing, helical blades or paddles 38 and 39, respectively, adapted to act on material introduced through the inlet 16 and feed such material toward the right, as viewed in FIGURE 2, into the chamber 11. As is best indicated in FIGURE 4, the shaft 33 includes a portion 40 the longitudinal axis of which is coincident with the longitudinal axis of the upper cylinder formed by the walls 9, and the shaft 34 has a similar elongated portion 41 the longitudinal axis of which is coincident with the longitudinal axis of the lower cylinder. Keyed or otherwise suitably fixed to the shaft portion 40 is a plurality of mixing blades; mixer or paddle member portions, or paddle members 42, and a corresponding plurality of similar members, portions, or paddles 43 are secured to the shaft portion 41. Each paddle 42 is provided with four lobes 44 having a radial dimension corresponding substantially to the inside radius of the cylinder in which it is accommodated. The periphery of the paddle 42 between adjacent lobes is convexly arcuate and has a minimum radius midway between adjacent lobes that is less than the radius of the lobes.

The paddle members 43 on the shaft 41 are similar to the paddle members 42, and each has four uniformly spaced lobes 46 having radial dimensions corresponding to the radial dimensions of the lobes 44. The peripheral edge 47 between adjacent lobes 46 is arcuately convex.

The paddles 42 and 43 are aligned transversely of the axes of rotation of their respective shafts 33 and 34, but, as is indicated in FIGURE 4, confronting paddles 42 and 43 are angularly offset 45° from one another so that the peripheral edges of the confronting paddles will remain substantially in engagement as the shafts are rotated and one of the paddles of each pair will always be wiping the other as well as the walls of the housing. This relationship can be assured by forming the arcuate edges 45 and 47 of the respective paddles on a smooth, convex curve, the minimum radius of which is shorter than the radii of the lobes by an amount corresponding to the overlap of the radii of the intersecting cylinders forming the chamber 11.

The construction of each paddle is such that the dispersion angle θ (FIGURE 4) is relatively small as compared to the dispersion angles of two- and three-lobe paddles, thereby providing a more beneficial ratio between the amount of energy that can be applied to material under treatment and the unit volume of the machine. Further, the configuration of the paddles permits the use of considerably larger diameter shafts than previously.

Figure 1:
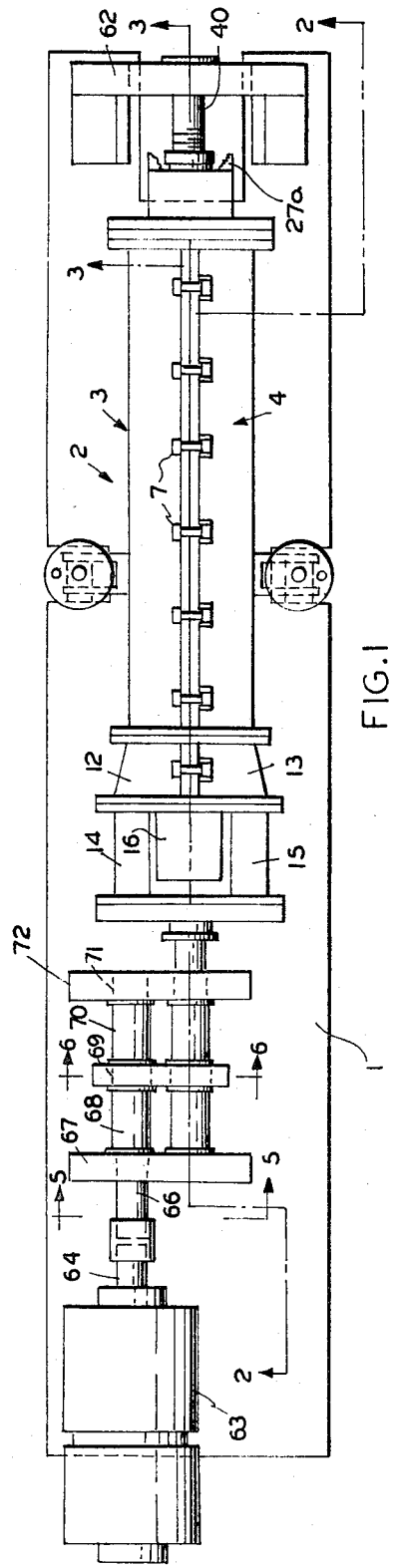
FIGURE 1 is a top plan view of a mixing machine constructed in accordance with the invention.
Figure 2:
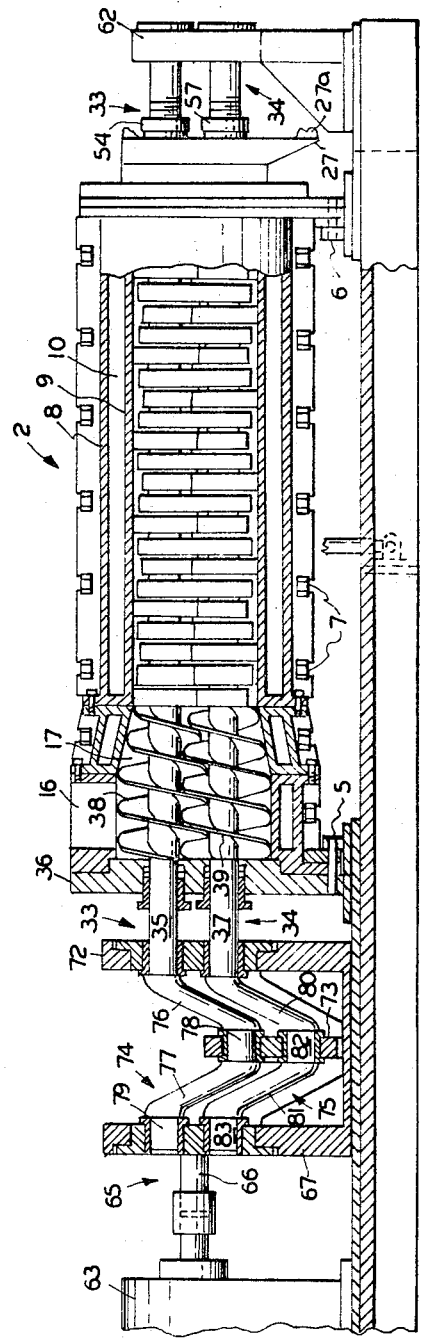
FIGURE 2 is a longitudinal sectional view taken on the line 2—2 of FIGURE 1.

As is indicated in FIGURES 2 and 3, successive paddles 42 are angularly offset along the shaft portion 40 so that a line connecting corresponding lobes 44 forms a helix. If desired, the peripheral surfaces of the paddles could also be helically pitched to aid in the advancement of the material. The successive paddles 43 on the shaft portion 41 are similarly angularly offset. Between alternate pairs of paddles on the shaft portions 40 and 41 are disk members 48 and 49, respectively, each of which has a radius corresponding substantially to the radius of the cylindrical portion of the chamber 11 in which it is accommodated. The arrangement of the disks 48 and 49 is such that they are staggered and, accordingly, provide a tortuous, substantially sinusoidal path extending longitudinally of the chamber.

At the discharge end of the chamber 11 the shaft portions 40 and 41 have fixed thereto a pair of generally frusto-conical, eccentrically mounted disks 50 and 51, respectively. The slope of the peripheries of the members 50 and 51 corresponds substantially to the inclination of the surface 24 of the end wall 23. Surrounding the shaft portion 40 and abutting the disk 50 is a sleeve 52 having a threaded portion 53 on which is threaded an annular plug 54 having a conical end 55 that is accommodated in the opening 22a and confronts the disk 50. A similar sleeve 56 is mounted on the shaft portion 41 and accommodates an annular threaded plug 57 having a conical end 58 which is accommodated in the opening 22b and confronts the disk 51. The annular plug members 54 and 57 may be adjusted axially of their respective shafts so as to increase or decrease the space between the conical ends 55 and 58 and the sides of the openings 22a and 22b. The forward ends of the shafts 33 and 34 are journaled by bearings 60 and 61 in an upstanding mounting plate 62 that is secured to the base 1.

Unique shaft driving means for rotating the shafts 33 and 34 is provided and comprises an electric motor 63 having its armature shaft 64 connected to a driving crank 65. The driving crank comprises a shaft portion 66 journaled in a mounting plate 67 supported on the base 1 to which is joined one end of an arm 68 that is inclined at an angle of less than 90° to the axis of rotation of the shaft portion 66. At the other end of the arm 68 is a shaft portion or web 69 that parallels the axis of rotation of the shaft portion 66 and to which is joined one end of an arm 70 similar to the arm 68 and which is inclined at the same angle to the web 69. At the other end of the arm 70 is a stub shaft portion 71 that is journaled in a mounting plate 72 for rotation about an axis coincident with the axis of rotation of the shaft portion 66.

Rotatably journaled on the web portion 69 of the crank 65 is a coupling plate 73 by means of which the crank 65 is coupled to the shafts 33 and 34.

The shaft 33 includes a crank 74 and the shaft 34 includes a crank 75. The crank 74 comprises a pair of arms 76 and 77 which are inclined to the axis of rotation of the shaft portion 35 along lines which extend at angles of less than 90°. The arms 76 and 77 are joined by a web portion 78 which is journaled in the coupling member 73. The free end of the arm 77 terminates in a shaft portion 79 that is journaled in the support 67 for rotation about an axis coincident with the axis of rotation of the shaft portion 35.

The crank 75 includes arms 80 and 81 that are inclined similarly to the arms 76 and 77 and which are joined by a web portion 82 that is journaled in the coupling member 73. The arm 81 has at its free end a stub shaft portion 83 which is journaled in the support 67.

Figure 6:
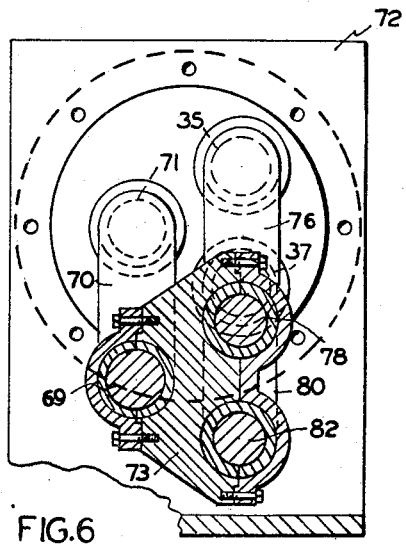
FIGURE 6 is a sectional view taken on the line 6—6 of FIGURE 1.

As is best shown in FIGURE 6, the web portions 69, 78, and 82 of the respective cranks are so related to one another and to the coupling member 73 that a line interconnecting the axes of rotation of the respective webs forms a closed, multisided geometric figure having uniform length sides. As a consequence, rotation of the driving crank 66 by the motor 63 may be imparted to the driven cranks 74 and 75 without the imposition of any binding forces thereon.

An important characteristic of the invention lies in the construction of the crank members 74 and 75. In each instance, the crank member is substantially V-shaped in appearance, the arms of the V converging toward the web. By forming each of the cranks to the same dimensions, it is possible for the cranks to nest one within another during their rotation and, therefore, avoid interference with one another.

Considerable space may be conserved by forming the arms of the respective crank members in the manner indicated in FIGURES 8 and 9. In the disclosed construction, the crank arm 68 is elliptical in transverse cross-section, as is shown in FIGURE 8, and is cylindrical in a section transverse to the axis of rotation. By means of this construction, the axes of rotation of the respective cranks may be spaced more closely to one another without sacrificing any substantial strength.

In apparatus constructed in accordance with the invention, the turning force or torque that may be applied to the shafts 33 and 34 is directly related to the throw of the respective cranks, or, stated differently, to the distance between centers of the shafts and the associated crank webs 78 and 82. As is shown in FIGURE 2, the distance between the axis of rotation of the shaft 33 and the axis of rotation of the web 78 is substantially greater than the distance between the axes of rotation of the shafts 33 and 34. As a result, a greater turning moment can be applied to the shaft 33 than could be applied by the application of the same force to an arm of shorter length than the arm 76. As should now be apparent, the torque applied to the respective shafts may be varied within wide limits and without imposing substantial deflection forces on the respective shafts. There is no theoretical maximum crank throw.

In the operation of the apparatus, material introduced through the inlet opening 16 is fed to the chamber 11, where it is thoroughly mixed and kneaded by the paddles 42 and 43 as it is advanced through the housing 2. It is to be understood that the material introduced may comprise one substance or several and that the terms "mix," "mixing," or "mixer" as used in the specification and claims may mean kneading, stirring, or disturbing one substance in the sense of moving one part of it relative to another, as well as the blending of several. At the discharge end of the housing, the material passes between the disks 50 and 51 and the member 23, and between the member 23 and the plug members 54 and 57, and is discharged from the spout 27. The jacks 28 and 29, together with the plug members 54 and 57, may be manipulated so as to adjust the size of the space through which material is discharged, thereby providing means for regulating the retention time of the materials in the housing as may be required.

The embodiment of the invention disclosed in FIGURES 10 and 11 is similar to the earlier described embodiment but differs from the latter in the construction of the discharge end of the housing 2. In the modified embodiment, the discharge end of the housing 2 slideably accommodates an end wall 85 constituting weir plate means in which there is a pair of frustoconical discharge openings 86 and 87 which surround the shafts 33 and 34, respectively. Mounted on the sleeves 52 and 56 which surround the shafts, and accommodated in the respective openings, are generally frustoconical plug members 88 and 89 which, together with the openings in the end wall 85, provide a discharge path for material leading to the spout 27. Fixed to the end wall 85 are four adjusting rods 90 by means of which the end wall may be adjusted axially of the housing to increase or decrease the size of the discharge openings while the machine is in operation. In other respects, the two embodiments are alike.

The disclosed embodiments are representative of presently preferred forms of the invention, but are intended to be illustrative rather than definitive thereof. The invention is defined in the claims.

I claim:

1. Mixing apparatus comprising: housing means having walls forming a chamber of the configuration of a plurality of intersecting cylinders; a plurality of spaced apart, substantially parallel, rotatable mixer shafts extending in said chamber; radially interacting paddle member portions having at least four substantially uniform length convex sides intersecting one another and forming at least four lobes, the spacing between said shafts and the size of said paddle member portions being such that each lobe of each paddle member portion on each of said shafts is substantially in wiping engagement with a lobe of an adjacent paddle member portion on another of said shafts; the paddle member portions and chamber also being configured so that the walls of the chamber are wiped by the paddle member portion; a crank arm connected with each of said mixer shafts and offset from the axis of rotation thereof; a driving shaft mounted for rotation about its own axis and having a crank portion offset from the axis of rotation thereof; each crank arm having an eccentric portion spaced from the axis of rotation of the mixer shaft to which it is connected by a distance greater than the spacing between the axes of rotation of the mixer shafts; and means coupling the crank portion of said driving shaft to the crank arms of said mixer shafts for rotating the latter in response to rotation of said driving shaft.

2. The apparatus set forth in claim 1 wherein the connections of all said shafts with said coupling means form substantially an equilateral triangle.

3. Mixer apparatus comprising a housing having walls forming a chamber; a plurality of spaced apart, substantially parallel mixer shafts; mixer members thereon; means mounting each of said shafts on said housing for rotation about its own axis; a crank arm on each of said shafts offset from the axis of rotation thereof; a driving shaft mounted for rotation about its own axis; a crank arm on said driving shaft offset from the axis of rotation thereof; and means coupling the crank arm of said driving shaft to the crank arms of said mixer shafts for rotating the latter in response to rotation of said driving shaft; said coupling means comprising a plate-like member and the connections of said crank arms to said member forming a closed, multisided geometrical figure wherein each side is of substantially uniform length.

4. Mixing apparatus comprising housing means having walls forming a chamber of the configuration of a plurality of intersecting cylinders; a plurality of spaced apart, substantially parallel, rotatable mixer shafts extending through said chamber; substantially interengaging mixer member portions on each of said shafts, the spacing between said shafts and the size of said mixer member portions being such that each mixer member portion on each of said shafts is substantially in wiping engagement with an adjacent mixer member portion on another of said shafts; the mixer member portions and chamber also being configured so that the walls of the chamber are wiped by the mixer member portions; driving means for rotating said shafts in the same direction of rotation and at the same speed; an eccentric portion at one end of each of said shafts; means rotatably coupling said eccentric portions and said driving means; said driving means including a rotatable shaft having an eccentric portion to which said mixer shafts are coupled by said coupling means; the eccentric portion of each of said shafts being spaced from the axis of rotation thereof by an arm that is inclined at less than 90° to said axis and the spacing between the eccentric portion and the axis of rotation of each of said shafts being greater than the spacing between the axes of rotation of said mixer shafts.

5. The construction set forth in claim 4 wherein said housing had a discharge opening at one end thereof; means on said mixer shafts for propelling material in said chamber toward and through said discharge opening; and means received in said opening for varying the size of said opening.

6. The construction set forth in claim 5 wherein the means for varying the size of said opening comprises an end member on said housing having converging inclined edges within said opening; plug members on said shafts having surfaces complementary to portions of said edges; and means mounting said plug members for relative movement axially of said shafts.

7. The construction set forth in claim 6 wherein said end member is axially movable relatively to said shafts; and including operating means connected to said end member for moving the latter.

8. The construction set forth in claim 6 wherein said plug members are mounted concentrically with said shafts for axial movement relative thereto.

9. Mixing apparatus comprising a housing having walls forming a chamber composed of a pair of intersecting cylinders; a pair of rotatable, parallel, spaced apart shafts extending through said chamber, one shaft being accommodated in one of said cylinders and the other shaft being accommodated in the other of said cylinders; a plurality of pairs of substantially radially interengaging paddle members fixed on each of said shafts and spaced axially along said shafts, each of said paddle members having a plurality of circumferentially spaced lobes thereon having a radial dimension corresponding substantially to the radius of its associated cylinder, the paddle members on one of said shafts being angularly offset such an amount with respect to the paddle members on the other of said shafts that the lobes of the paddle members on one of said shafts intermesh with the lobes of the paddle members on the other of said shafts; annular discs of substantially the diameter of said cylinders spaced alternately on said shafts between said paddle members to cause the material to take a sinusoidal path; and driving means connected to said shafts for rotating them simultaneously.

10. A mixer or the like construction comprising a housing having walls forming a mixing chamber; radially intermeshing mixing members in said chamber; a plurality of spaced apart shafts journaled in said housing for rotation about parallel axes and to which said mixing members are connected for rotation; crank means connected to each of said shafts and comprising an arm inclined to the axis of rotation of its associated shaft, the angle of inclination of each of said arms being such that the crank means on adjacent shafts may nest without said arms engaging one another; driving means; and means coupling said driving means with each of said shafts for rotating the latter simultaneously, said arm of each of said cranks being elliptical in transverse cross-section.

11. The construction set forth in claim 10 wherein said driving means comprises a rotatable driven shaft and a crank connected thereto, said crank having an arm offset from the axis of rotation of said driven shaft and being connected to said coupling means.

12. The construction set forth in claim 11 wherein said arms are connected to said coupling means at uniformly spaced apart points.

13. Mixing apparatus comprising housing means having walls forming a chamber of the configuration of a plurality of intersecting cylinders; a plurality of spaced apart, substantially parallel, rotatable mixer shafts extending through said chamber; substantially interengaging mixer member portions on each of said shafts, the spacing between said shafts and the size of said mixer member portions being such that each mixer member portion on each of said shafts is substantially in wiping engagement with an adjacent mixer member portion on another of said shafts; the mixer member portions and chamber also being configured so that the walls of the chamber are wiped by the mixer member portions; driving means for rotating said shafts in the same direction of rotation and at the same speed; and annular disk members of a diameter corresponding substantially to the interior diameters of said cylinders forming the chamber alternately arranged on the shafts between said mixer member portions to cause the material to take a sinusoidal path.

14. Mixing apparatus comprising housing means having walls forming a chamber of the configuration of a plurality of intersecting cylinders; a plurality of spaced apart, substantially parallel, rotatable mixer shafts extending through said chamber; substantially interengaging mixer member portions on each of said shafts, the spacing between said shafts and the size of said mixer member portions being such that each mixer member portion on each of said shafts is substantially in wiping engagement with an adjacent mixer member portion on another of said shafts; the mixer member portions and chamber also being configured so that the walls of the chamber are wiped by the mixer member portions; driving means for rotating said shafts in the same direction of rotation and at the same speed; an eccentric portion at one end of each of said shafts; means rotatably coupling said eccentric portions and said driving means; said driving means including a rotatable shaft having an eccentric portion to which said mixer shafts are coupled by said coupling means; the connections of all said shafts with said coupling means forming substantially an equilateral triangle.

15. Mixing apparatus comprising housing means having walls forming a chamber of the configuration of a plurality of intersecting cylinders; means for introducing material to be mixed adjacent one end of said chamber; a plurality of spaced apart, substantially parallel, rotatable mixer shafts extending through said chamber; substantially interengaging mixer member portions on each of said shafts, the spacing between said shafts and the size of said mixer member portions being such that each mixer member portion on each of said shafts is substantially in wiping engagement with an adjacent mixer member portion on another of said shafts; the mixer member portions and chamber also being configured so that the walls of the chamber are wiped by the mixer member portions; driving means for rotating said shafts in the same direction and at the same speed; discharge plate means for the other end of said housing means extending radially of said housing means to close it except for at least one opening through said discharge plate means through which at least one of said shafts generally concentrically extends; and a non-integral ring plug on said one of said shafts disposed within said opening and mounted for rotation with said one of said shafts, said ring plug being of smaller diameter than said opening to form a passage to pass material out said opening.

16. The combination defined in claim 15 in which said discharge plate means is mounted for axial movement relative to said ring plug.

17. The combination defined in claim 15 in which openings are provided in said discharge plate means for each shaft; ring plugs are provided in each opening; at least one of said ring plugs and the discharge plate means surrounding them have axially tapering surfaces; and means is provided for relatively axially moving said ring plugs and discharge plate means.

18. The combination defined in claim 17 in which both said ring plugs and the marginal walls of said openings have complementary axially tapering surfaces.

19. The combination defined in claim 15 in which each of said plurality of shafts extends through an opening in said discharge plate means and one of said ring plugs is provided on each shaft within each opening and of smaller diameter than the opening to form a plurality of passages to meter material out.

20. Mixer apparatus comprising a housing having walls forming a chamber; a plurality of spaced apart, substantially parallel mixer shafts; radially interwiping mixer members thereon; means mounting each of said mixer shafts in said housing for rotation about its own axis; a generally V-shaped crank arm on each of said mixer shafts offset from the axis of rotation thereof; a driving shaft mounted for rotation about its own axis; a generally V-shaped crank arm on said driving shaft offset from the axis of rotation thereof; each crank arm including an eccentric portion spaced from the axis of rotation of the shaft to which it is connected by a distance greater than the spacing between the axes of rotation of the mixer shafts; and means coupling the crank arm of said driving shaft to the crank arms of said mixer shafts for rotating the latter in response to rotation of said driving shaft.

21. Mixer apparatus comprising a housing having walls forming a chamber; a plurality of spaced apart, substantially parallel mixer shafts; radially interacting mixer members on said mixer shafts cooperating to act radially upon the material to be mixed; means mounting each of said mixer shafts in said housing for rotation about its own axis; a crank arm connected with each of said mixer shafts and offset from the axis of rotation thereof; a driving shaft mounted for rotation about its own axis and having a crank portion offset from the axis of rotation thereof; each crank arm including an eccentric portion spaced from the axis of rotation of the mixer shaft to which it is connected by a distance greater than the spacing between the axes of rotation of the mixer shafts; and means coupling the crank portion of said driving shaft to the crank arms of said mixer shafts for rotating the latter in response to rotation of said driving shaft.

22. Mixing apparatus comprising housing means having walls forming a chamber of the configuration of a plurality of intersecting cylinders; a plurality of spaced apart, substantially parallel, rotatable mixer shafts extending through said chamber; substantially interengaging paddle member portions on each of said shafts; each of said paddle member portions comprising a disk like element having at least four substantially uniform length convex sides intersecting one another and forming at least four lobes, the spacing between said shafts and the size of said paddle member portions being such that each lobe of each paddle member portion on each of said shafts is substantially in wiping engagement with a lobe of an adjacent paddle member portion of another of said shafts; the paddle member portions and chamber also being configured so that the walls of the chamber are wiped by the paddle member portions; driving means for rotating said shafts in the same direction and at the same speed; and annular disk members of a diameter corresponding substantially to the internal diameters of said intersecting cylinders forming the housing alternately arranged on the shafts between said paddle member portions to cause the material to take a sinusoidal path through said housing.

23. Mixing apparatus comprising: housing means having walls forming a chamber of the configuration of a plurality of intersecting cylinders; means for introducing material to be mixed adjacent one end of said chamber; a plurality of spaced apart, substantially parallel, rotatable mixer shafts extending through said chamber; substantially interengaging mixer member portions on each of said shafts, the spacing between said shafts and the size of said mixer member portions being such that each mixer member portion on each of said shafts is substantially in wiping engagement with an adjacent mixer member portion on another of said shafts; the mixer member portions and chamber also being configured so that the walls of the chamber are wiped by the mixer member portions; driving means for rotating said shafts in the same direction and at the same speed; discharge plate means for the other end of said housing means extending radially of said housing means to close it except for openings through said discharge plate means through which each of said shafts generally concentrically extends; a non-integral ring plug on each of said shafts disposed within each opening, each ring plug being of smaller diameter than the opening in which it is disposed to form a passage to pass material out said opening; at least one of said ring plugs and the discharge plate means surrounding it having axially tapering surfaces; and means provided for relatively axially moving said ring plugs and discharge plate means.

References Cited

UNITED STATES PATENTS

| 2,814,472 | 11/1957 | Erdmenger | 259—104 |
| 3,198,491 | 8/1965 | Loomans et al. | 259—41 X |

FOREIGN PATENTS

| 905,082 | 9/1962 | Great Britain. |
| 379,225 | 8/1964 | Switzerland. |

WILLIAM I. PRICE, *Primary Examiner.*

J. M. BELL, *Assistant Examiner.*